3,407,201
HETEROCYCLICALLY SUBSTITUTED MONO-
HALOGENO-1,3,5-TRIAZINES
Christian Luethi, Munchenstein, Hans Rudolf Biland,
Basel, Max Schellenbaum, Riehen, and Max Duennen-
berger, Frenkendorf, Basel-Land, Switzerland, assignors
to Ciba Limited, Basel, Switzerland, a Swiss company
No Drawing. Filed Jan. 28, 1966, Ser. No. 523,552
Claims priority, application Switzerland, Feb. 4, 1965,
1,541/65
12 Claims. (Cl. 260—248)

ABSTRACT OF THE DISCLOSURE

New heterocyclically substituted monohalogeno-1,3,5-triazines are provided which may be represented by the formula

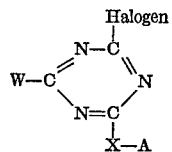

wherein A contains at least one ring nitrogen atom and represents an aromatic ring system made up of 1 to 3 six-membered rings, which are fused in the case of ring systems containing 2 or 3 rings, and is linked through a ring carbon atom with X; X represents a divalent hetero-atom bridge member chosen from —O—, —S—, and —NQ—, where Q stands for hydrogen or a lower alkyl group and W represents a monovalent, aliphatic, heterocyclic, aromatic or araliphatic residue which is linked through a carbon atom with the triazine ring and contains no more than 20 carbon atoms.

The compounds of the invention are especially useful as fungicides and bactericides.

---

The present invention provides new heterocyclically substituted monohalogeno-1,3,5-triazines having a fungicidal and at the same time a bactericidal action, and includes also their use as well as processes for their manufacture.

The compounds of this invention correspond to the general Formula 1

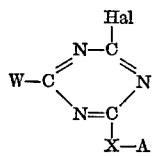

where Hal represents a halogen atom, A contains at least one ring nitrogen atom and represents an aromatic ring system made up of 1 to 3 6-membered rings, which are fused in the case of the 2-membered or 3-membered ring systems, and is linked through a ring carbon atom with X; X represents a divalent hetero-atom bridge member chosen from —O—, —S—, and —NQ—, where Q stands for hydrogen or a lower alkyl group (preferably hydrogen), W represents a monovalent, aliphatic, heterocyclic, aromatic or araliphatic residue which is linked through a carbon atom with the triazine ring and contains no more than 20 carbon atoms.

The residues A and W in the above formula may contain further substituents. Preferred products of this invention within the scope of the above formula are new triazine derivatives of the general formula:

(2)
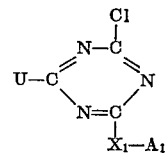

where $X_1$ represents a divalent hetero-atom bridge member chosen from —O—, —S—, and —NH—; $A_1$ contains one ring nitrogen atoms and represents an aromatic ring system which consists of one or two fused six-membered rings and is bound through a ring carbon atom with $X_1$, and U represents a phenyl radical, a benzene ring substituted by alkyl groups, alkoxy groups, halogen atoms, alkylated amino groups or a phenyl group, a naphthyl radical, or a furyl or thienyl residue.

On the other hand, the compounds are also of value which correspond to the formula:

(3)
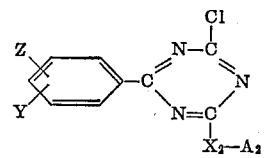

where $A_2$ contains 1 or 2 ring nitrogen atoms and represents an aromatic ring system consisting of one or two fused 6-membered rings bound through a ring carbon atom with $X_2$; $X_2$ represents a divalent hetero-atom bridge member chosen from —O— and —S—, and Z and Y each represents a hydrogen atom, an alkyl or alkoxy group containing 1 to 6 carbon atoms, a halogen atom, a lower alkylated amino group, or Y or Z is a phenyl group, or $Y+Z$ may form together with the phenyl group, a naphthyl ring.

Compounds obtained by a preferred variant of the present invention are those of the formula:

(4)
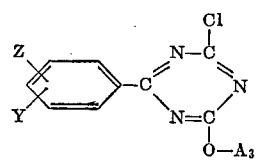

where $A_3$ contains 1 or 2 ring nitrogen atoms and represents an aromatic ring system consisting of two fused 6-membered rings bound through a ring carbon atom with the bridge member —O—; Z and Y represent hydrogen, an alkyl or alkoxy group containing 1 to 6 carbon atoms, halogen, an amino group alkylated with alkyl groups containing 1 to 8 carbon atoms, or Y or Z represents a phenyl radical, or $Y+Z$ represent, together with the phenyl group, a naphthyl ring.

The new triazine derivatives of the general Formula 5 also deserve special mention:

(5)
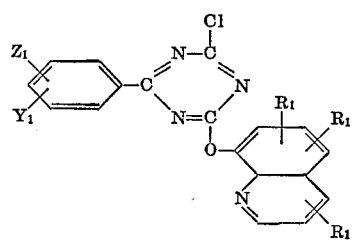

where $Z_1$ and/or $Y_1$ represent a hydrogen atom, an alkyl or alkoxy group containing 1 to 6 carbon atoms, a halogen atom, an alkylated amino group containing up to 6 carbon atoms or $Z_1$ alone represents a phenyl group, and the residues $R_1$ represent hydrogen atoms or halogen atoms or each $R_1$ alone represents an alkyl group containing 1 to 4 carbon atoms.

Of special value are those compounds corresponding to the Formula 4 in which Y is hydrogen and Z as $Z_2$, when it stands in para-position to the bond of the phenyl radical with the triazine ring, represents a hydrogen atom, an alkyl or alkoxy group containing 1 to 4 carbon atoms, a phenyl group, a dialkylamino group whose alkyl residues contain 1 to 4 carbon atoms, or a chlorine or bromine atom.

The cyclic system $A_3$ in the Formula 4 is preferably a quinoline ring which is bound in position 8 and may be further substituted, so that a specific valuable type of compound is represented by a formula:

(6)
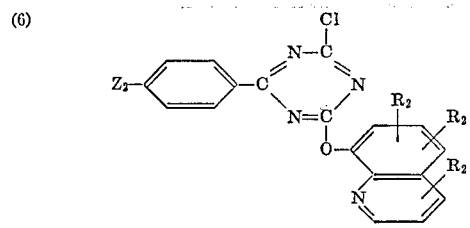

where $Z_2$ has the above meaning and the residues $R_2$ are hydrogen or halogen atoms, or in each case one $R_2$ alone may stand for an alkyl group containing 1 to 4 carbon atoms, or for a nitro, nitroso or sulpho group.

As examples of compounds belonging to the individual types of compounds corresponding to the above formulae there may be mentioned those in which the residue A or $A_1$ respectively in the structural element of the formula, (7)
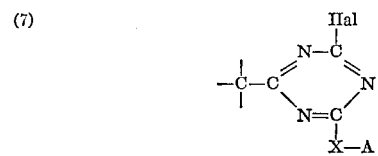

which is essential to the present invention, belongs to one of the following types of compounds:

(a) Quinolines—the isomeric hydroxyquinolines, especially the monohydroxyquinolines, also polyhydroxyquinolines, for example 2,4-dihydroxyquinoline, the isomeric aminoquinolines and mercaptoquinolines, for example 2- and 8-mercaptoquinolines
(b) Quinaldines—for example 4- and 8-hydroxyquinaldine, 4- and 8-aminoquinaldine
(c) Isoquinolines—such as -hydroxy-isoquinoline, 4- and 5-aminoisoquinoline
(d) Cinnolines
(e) Phthalazines
(f) Quinazolines—such as 4-hydroxyquinazoline
(g) Quinoxalines—such as 2,3-quinoxaline-diol or -dithiol
(h) Acridines—for example 1-hydroxyacridine or 9-aminoacridine
(i) Phenazines—such as 1-hydroxyphenazine or 4-aminophenazine
(k) Pyridines—for example 2-, 3- and 4-hydroxypyridine and the corresponding aminopyridines, 2- or 4-mercaptopyridines or nicotinic acid
(l) Pyridazines—for example 3,6-dihydroxypyridazine or amino or mercapto analogues thereof
(m) Pyrimidines—for example 2- or 4-hydroxypyrimidine or dihydroxypyrimidines, 2-aminopyrimidine, 2-mercaptopyrimidine or 6-methylthiouracil,
(n) Pyrazines.

From among the practically specially valuable hydroxyquinolines and -quinaldines the following may be mentioned as non-limitative examples:

(a) Halogen derivatives:

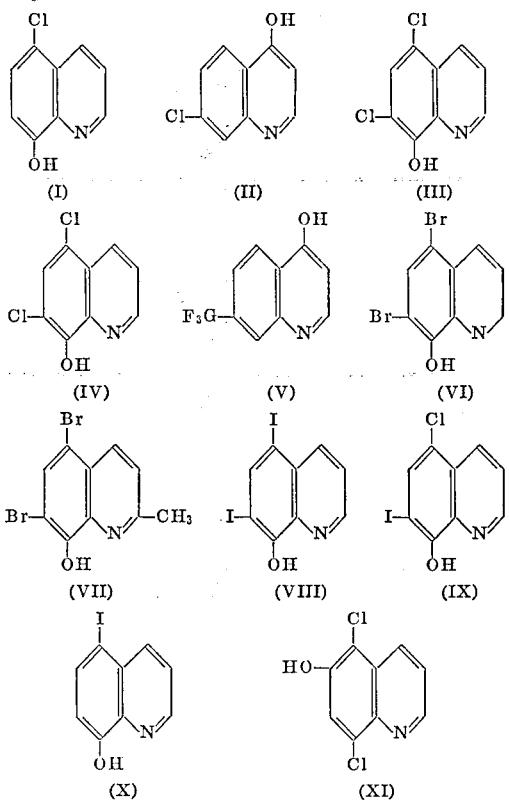

(b) Sulphonic acids:

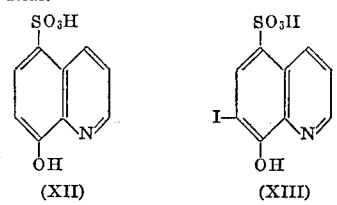

(c) Carboxylic acids:

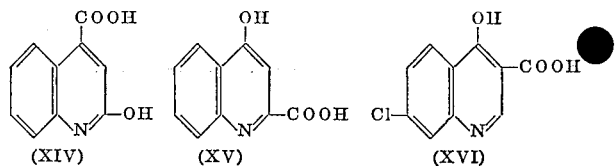

(d) Nitro compounds:

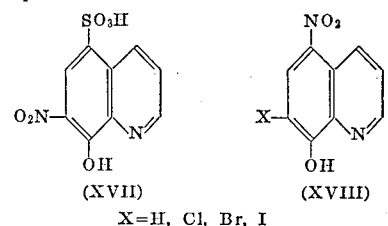

X=H, Cl, Br, I (e) Alkoxy compounds:

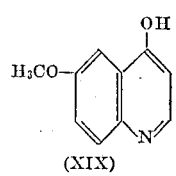

The 1,3,5-triazine derivatives defined above may be manufactured quite generally by reacting an equimolecular proportion of a dihalogeno-triazine of the formula (8)
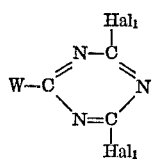

with a compound of the formula (9)         H—X—A where W, X and A have the same meanings as in Formula 1 and $Hal_1$ stands for a chlorine or bromine atom.

According to a particularly advantageous method the triazine derivatives corresponding to the Formulas 2, 3 or 4 may be manufactured by reacting one mol of a 2-aryl-4,6-dichloro-1,3,5-triazine with one mol of an N-heterocyclic phenol or mercaptan. This reaction may be carried out in an aqueous medium, that is to say in a medium containing apart from water also water-soluble organic solvents that are chemically inert towards the reactants, such for instance as acetone or dioxan, advantageously in the presence of an acid acceptor, for example an inorganic base, such as an alkali or alkaline earth metal hydroxide or alkali metal carbonate.

According to another variant this reaction may be carried out in an organic solvent that is chemically inert towards the reactants and possesses an adequate solving property, for example, chlorobenzene, dichlorobenzene, nitrobenzene or the like; in these cases the reaction is advantageously performed in the presence of a Lewis acid, such as aluminum chloride, tin tetrachloride, boron trifluoride or similar substances having a catalytic effect, or working up may be performed with an acid acceptor as mentioned above.

Finally, it is also possible to react the reactants in a melt in the absence of a solvent, if desired in the presence of a Lewis acid or of an acid acceptor as mentioned above. The N-heterocyclic phenols to be used in the reaction may be used directly in the phenol form or in the form of their alkali metal salts. Normally, the reactants are reacted in equimolecular proportions, but this does not exclude the use of a slightly greater or smaller proportion in special cases. The reaction temperature depends on the reactivity of the components and the reaction medium chosen and is advantageously within the range from 0° C. to approximately the boiling point of the solution or reaction mixture; in the case of melts it may be up to about 280° C., provided the reactants have adequate thermostability. The amount of acid acceptor, if such is used, corresponds advantageously at least to the amount equivalent to the hydrogen halide to be eliminated. Lewis acids are generally used in an amount from 0.1 to 2.5 equivalents.

According to a preferred variant, which is particularly suitable for the reaction of hydroxy- or mercapto-quinolines with 2-aryl-4,6-dichloro-1,3,5-triazines, for example, the reactants (a) are reacted in a solution of a chlorobenzene in the presence of 0.1 to 2.5 equivalents of aluminum chloride or (b) in a chlorobenzen or methylbenzene solution in the presence of an equivalent amount of an acid acceptor.

According to one variant of the process for the manufacture of compounds of the Formula 1 a compound corresponding to this formula is first synthesized by one of the methods referred to above and then the halogen atom, which is preferably attached in position 4 on the triazine ring, is exchanged for another halogen. It is possible, for example, to prepare in this manner the valuable fluoro compounds of this type.

The compounds accessible by the afore-mentioned processes, especially the triazine derivatives of the Formulae 4, 5 and 6, display a distinct antibacterial activity combined with a high antimycotic effect.

In this connection special attention is directed to the use of compounds of the general formula

(10)
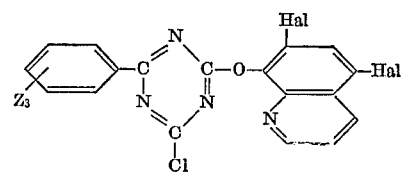

where Hal represents a halogen atom and $Z_3$ a hydrogen atom, a halogen atom or an alkyl group containing 1 to 4 carbon atoms—for protecting organic materials from fungi and bacteria, as well as the use of compounds of the general formula (11)

where Hal represents a halogen atom and $Z_4$ a hydrogen atom, a halogen atom or an alkyl or alkoxy group containing 1 to 4 carbon atoms—for protecting organic materials from fungus attacks.

The broad antibacterial activity spectrum observed in this connection, which with many compounds extends to both Gram-positive and Gram-negative bacteria, is particularly unexpected. Of special advantage in the application is the absence of odours and colours in the compounds of this invention.

Thus, the present invention includes also the use of the new compounds in general pest control. The antibacterial compounds may be applied in a very wide sphere, especially for protecting organic substrates from attacks by destructive and pathogenic (including phytopathogenic) micro-organisms. Accordingly, the antimicrobial substances are suitable for use as preservatives and as disinfectants for textile materials and technical products of all descriptions, in plant protection, in agriculture, in veterinary medicine and in cosmetics.

From among technical products that can be preserved with the aid of the new compounds there may be mentioned the following examples: Textile auxiliaries and improving agents, glues, binders, paints, colour and printing pastes an dsimilar preparations based on organic or inorganic dyestuffs or pigments, including those which contain casein or other organic compounds. Wall and ceiling paints, for example such as contain a protein paint binder, can be protected from attacks by pests by admixture with the new compounds. The new products are also suitable for use in timber protection.

Furthermore, the new compounds may be used for providing fibres and textile materials with a preserving and disinfecting finish, and these fibres may be natural or man-made fibres. On application to such fibres the products of this invention act permanently against harmful (including pathogenic) organisms, for example fungi and bacteria. The addition of the new compounds may take place before, during or after these textile materials are or have been treated with other substances, for example colour or printing pastes, dressing agents or the like.

Textile materials treated in this maner are also protected from the appearance of perspiration odour as caused by micro-organisms.

The new compounds may also be used to preserve the products of the cellulose and paper industries, inter alia to prevent the known slime formation due to micro-organisms in the machines used for the manufacture of paper.

Furthermore on incorporation of the compounds of this invention in wash active or surface active substances there are obtained detergents and cleansing agents having an excellent antibacterial or antimycotic effect. The compounds of the general formulae defined above may, for example, be incorporated in soaps or combined with soap-free, wash-active or surface-active substances, or they may be combined with mixtures of soaps and soap-free wash-active substances, without losing any of their antimicrobial activity in these combinations.

Cleansing agents containing the compounds of the above formulae may also be used in industry and in the household, and also in the food industry, for example in dairies, breweries and abattoirs. The new compounds may also form an ingredient of preparations used for cleansing and/or disinfection in hospitals and in the surgery.

The action of the compounds of this invention may also be utilized to provide plastics with preserving and disinfecting dressings. When plasticizers are used it is of advantage to add the antimicrobial substance in the form of a solution or dispersion in the plasticizer to the plastic material, it being of value to ensure as uniform a distribution as possible of the substance in the plastic material. Plastic materials having antimicrobial properties may be used in a variety of objects for general use which are desired to be resistant to pathogens of all kinds, for example bacteria and fungi, for example in doormats, bathroom curtains, seats, treads in swimming baths, wall coverings or the like. By incorporation with suitable wax and polishing preparations there are obtained preparations for the care of floors and furniture having a disinfectant action.

The antimicrobial ingredients may be applied to the textile materials to be protected in a wide variety of ways, for example by impregnating or spraying them with solutions or suspensions containing the above-mentioned compounds as active ingredient. The amount of active ingredient used may vary according to the ultimate purpose from 1 to 30 g. of active substance per litre of treating liquor.

In most cases textile materials of natural or synthetic origin are adequately protected from attacks by fungi and bacteria by a content of 0.1 to 3% of active substance. The active substances mentioned may be used in conjunction with other textile auxiliaries, such as dressing agents, anticrease finishes and the like.

The forms in which the compounds of this invention are applied may correspond to those conventionally used for pesticides; for example, preparations containing the said active substances may further contain additives such as vehicles, solvents, diluents, dispersants, wetting agents, adhesives or the like, as well as other pesticides.

Unless otherwise indicated, parts in the following examples are by weight.

Example 1

A solution of 29.0 parts of 8-hydroxyquinoline in 100 parts by volume of dioxan is stirred into a solution of 48.0 parts of 2-para-tolyl-4,6-dichloro-1,3,5-triazine in 500 parts by volume of dioxan and 30 parts of water. 110 parts of a 1.82 N-sodium hydroxide solution are dropped in at 50 to 60° C. at a rate such that the pH value does not rise above 7. The reaction mixture is then poured over 2000 parts of ice water and the resulting suspension is stirred in for 1 hour. The product of the formula

(12)
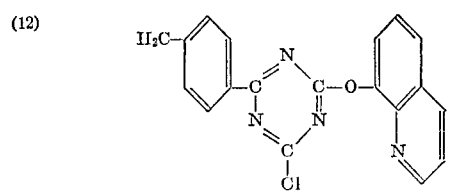

is filtered off, rinsed with 500 parts of water and dried. The yield amounts to about 66 parts. The product obtained by recrystallization from methylenechloride+methanol forms colourless crystals and melts at 193–195° C.

$C_{19}H_{13}ON_4Cl$.—Calculated: C, 65.43; H, 3.76; N, 16.06%. Found: C, 65.28; H, 3.88; N, 16.19%.

Example 2

13.0 parts of 2-(4'-chlorophenyl)-4,6-dichloro-1,3,5-triazine and 7.3 parts of 8-hydroxyquinoline are dissolved in 120 parts of dichlorobenzene, and 7.4 parts of anhydrous aluminium chloride are then stirred in at 10° C. The reaction mixture is heated for 20 hours at 40° C. and then poured over 1000 parts of ice water. The aqueous phase is separated and the dichlorobenzene solution washed with water and the solvent expelled with steam. The residue is filtered off and dried. The yield amounts to about 13 parts. The product of the formula

(13)
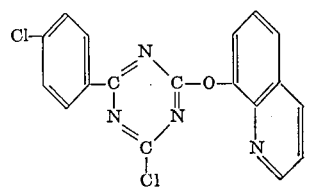

is purified by two recrystallizations from methylenechloride+petroleum ether and melts at 192–194° C.

$C_{18}H_{10}ON_4Cl_2$.—Calculated: C, 58.56; H, 2.73; N, 15.18%. Found C, 58.28; H, 2.80; N, 15.29%.

Example 3

A solution of 13.0 parts of 2-(4'-chlorophenyl)-4,6-dichloro-1,3,5-triazine and 15.2 parts of 5,7-dibromo-8-hydroxyquinoline in 150 parts of chlorobenzene is mixed with 4.2 parts of sodium bicarbonate and heated with stirring to 130° C. The reaction mixture is heated for 16 hours at this temperature, cooled and then poured into 1000 parts of water. The aqueous layer is separated and the chlorobenzene solution washed with water. After the chlorobenzene has been removed by steam distillation the product of the formula

(14)
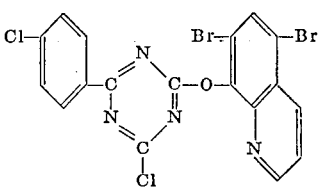

is obtained in a yield of about 25 parts. For purification the product may be recrystallized from methylenechloride+methanol. The pure compound melts at 215–216° C.

$C_{18}H_8ON_4Cl_2Br_2$.—Calculated: C, 41.02; H, 1.53; N, 10.63%. Found: C, 40.88; H, 1.39; N, 10.81%.

Examples 4 to 25

The compounds of the formula

(15)
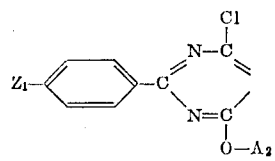

shown in the following Table I were prepared as described in Example 1:
TABLE I
| Ex. No. | Formula No. | $A_2=$ | $Z_1=$ | M.P., °C. | C, calc.; C, found | H, calc.; H, found | N, calc.; N, found |
|---|---|---|---|---|---|---|---|
| 4 | (16) | 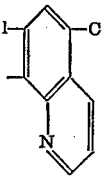 | Cl | 193–195 | 49.35 / 49.34 $C_{18}H_8ON_4Cl_4$ | 1.84 / 1.87 | 12.79 / 12.62 |
| 5 | (17) | 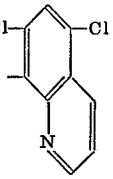 | $CH_3$ | 242–243 | 54.64 / 54.73 $C_{19}H_{11}ON_4Cl_3$ | 2.65 / 2.72 | 13.41 / 13.41 |
| 6 | (18) | 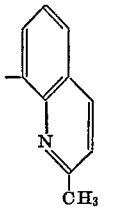 | Cl | 179–180 | 59.55 / 59.42 $C_{19}H_{12}ON_4Cl_2$ | 3.16 / 3.06 | 14.62 / 14.58 |
| 7 | (19) | 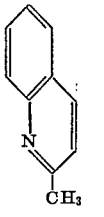 | $CH_3$ | 184–186 | 66.21 / 66.12 $C_{20}H_{15}ON_4Cl$ | 4.17 / 4.00 | 15.44 / 15.37 |
| 8 | (20) | 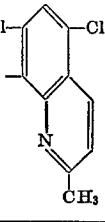 | Cl | 166–167 | 50.47 / 50.65 $C_{19}H_{10}ON_4Cl_4$ | 2.23 / 2.31 | 12.39 / 12.50 |
| 9 | (21) | 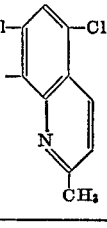 | $CH_3$ | 183–185 | 55.64 / 55.37 $C_{20}H_{13}ON_4Cl_3$ | 3.04 / 2.92 | 12.98 / 12.78 |
| 10 | (22) |  | Cl | 164–166 | 52.69 / 52.66 $C_{14}H_8ON_4Cl_2$ | 2.53 / 2.72 | 17.56 / 17.51 |
| 11 | (23) | 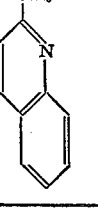 | Cl | 185–186 | 59.55 / 59.72 $C_{19}H_{12}ON_4Cl_2$ | 3.16 / 3.14 | 14.62 / 14.55 |

TABLE I—Continued
| Ex. No. | Formula No. | A₂= | Z₁= | M.P., °C. | C, calc.; C, found | H, calc.; H, found | N, calc.; N, found |
|---|---|---|---|---|---|---|---|
| 12 | (24) | 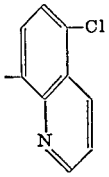 | Cl | 187–188 | 53.56 / 53.37 $C_{18}H_9ON_4Cl_3$ | 2.25 / 2.34 | 13.88 / 13.51 |
| 13 | (25) | 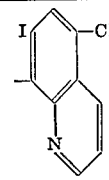 | Cl | 231–232 | 40.83 / 40.35 $C_{18}H_8ON_4Cl_3I$ | 1.52 / 1.48 | 10.58 / 10.42 |
| 14 | (26) | 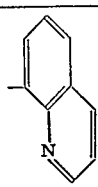 | H | 174–175 | 64.58 / 64.77 $C_{18}H_{11}ON_4Cl$ | 3.31 / 3.40 | 16.74 / 16.44 |
| 15 | (27) | 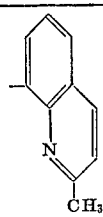 | H | 153–155 | 65.43 / 65.69 $C_{19}H_{13}ON_4Cl$ | 3.76 / 3.61 | 16.06 / 16.34 |
| 16 | (28) | 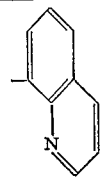 | (CH₃)₃C— | 143–144 | 67.60 / 67.56 $C_{22}H_{19}ON_4Cl$ | 4.90 / 4.91 | 14.33 / 14.11 |
| 17 | (29) | 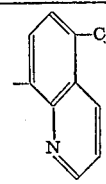 | (CH₃)₃C— | 142–143 | 62.13 / 61.83 $C_{22}H_{18}ON_4Cl_2$ | 4.27 / 4.40 | 13.17 / 13.11 |
| 18 | (30) | 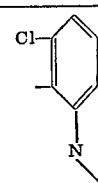 | (CH₃)₃C— | 169–170 | 57.47 / 57.54 $C_{22}H_{17}ON_4Cl_3$ | 3.73 / 3.69 | 12.19 / 12.03 |
| 19 | (31) | 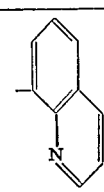 | H₃CO— | 177–178 | 62.56 / 61.99 $C_{19}H_{13}O_2N_4Cl$ | 3.59 / 3.77 | 15.36 / 15.10 |

TABLE I—Continued

| Ex. No. | Formula No. | $A_2=$ | $Z_1=$ | M.P., °C. | C, calc.; C, found | H, calc.; H, found | N, calc.; N, found |
|---|---|---|---|---|---|---|---|
| 20 | (32) | 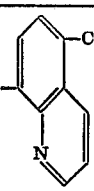 | $H_3CO-$ | 197–199 | 57.16<br>57.03 | 3.03<br>3.07 | 14.03<br>13.87 |
| | | | | | | $C_{19}H_{12}O_2N_4Cl_2$ | |
| 21 | (33) | 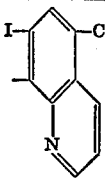 | $H_3CO-$ | 222–224 | 43.46<br>43.36 | 2.11<br>1.94 | 10.67<br>10.61 |
| | | | | | | $C_{19}H_{11}O_2N_4Cl_2I$ | |
| 22 | (34) | 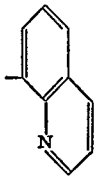 |  | 192–193 | 70.16<br>69.95 | 3.68<br>3.85 | 13.64<br>13.49 |
| | | | | | | $C_{24}H_{15}ON_4Cl$ | |
| 23 | (35) | 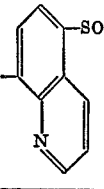 | Cl | 290 | 48.12<br>48.05 | 2.24<br>2.24 | 12.47<br>12.32 |
| | | | | | | $C_{18}H_{10}O_4N_4SCl_2$ | |
| 24 | (36) | 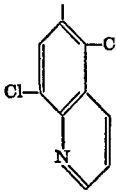 | Cl | 257–258 | 49.35<br>49.11 | 1.84<br>1.75 | 12.79<br>12.54 |
| | | | | | | $C_{18}H_8ON_4Cl_4$ | |
| 25 | (37) | 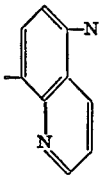 | Cl | 190–191 | 52.20<br>52.32 | 2.19<br>2.29 | 16.91<br>16.93 |
| | | | | | | $C_{18}H_9O_3N_5Cl_2$ | |

Examples 26 to 40

The examples listed in the following Table II were prepared as described in Example 1. The symbols A, X and W have the same meanings as in Formula 1.

TABLE II

| Ex. No. | Formula No. | $A=$ | $X=$ | $W=$ | M.P., °C. | C, calc.; C, found | H, calc.; H, found | N, calc.; N, found |
|---|---|---|---|---|---|---|---|---|
| 26 | (38) | 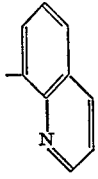 | $-S-$ |  | 125 | 56.12<br>56.62 | 2.62<br>2.60 | 14.54<br>14.27 |
| | | | | | | $C_{18}H_{10}N_4SCl_2$ | | |

TABLE II—Continued
| Ex. No. | Formula No. | A= | X= | W= | M.P., °C. | C, calc.; C, found | H, calc.; H, found | N, calc.; N, found |
|---|---|---|---|---|---|---|---|---|
| 27 | (39) | 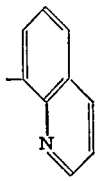 | —NH— | 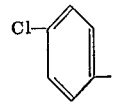 | 248–252 | 58.71<br>59.04<br>$C_{18}H_{11}N_5Cl_2$ | 3.01<br>3.03 | 19.02<br>18.53 |
| 28 | (40) | 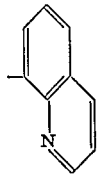 | —O— | 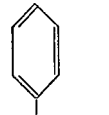 | 70 | 58.56<br>58.85<br>$C_{18}H_{10}ON_4Cl_2$ | 2.73<br>3.00 | 15.18<br>15.00 |
| 29 | (41) | 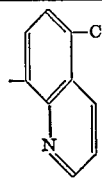 | —O— | 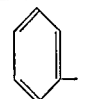 | 176–177 | 53.56<br>53.72<br>$C_{18}H_9ON_4Cl_3$ | 2.25<br>2.21 | 13.88<br>13.67 |
| 30 | (42) | 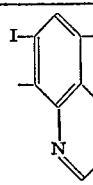 | —O— | 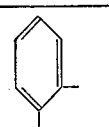 | 140–141 | 40.83<br>40.99<br>$C_{18}H_8ON_4Cl_3I$ | 1.52<br>1.62 | 10.58<br>10.43 |
| 31 | (43) | 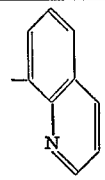 | —O— | 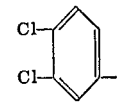 | 200–201 | 53.56<br>53.64<br>$C_{18}H_9ON_4Cl_3$ | 2.25<br>2.23 | 13.88<br>13.66 |
| 32 | (44) | 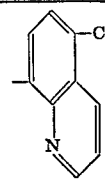 | —O— | 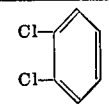 | 184–185 | 49.35<br>49.07<br>$C_{18}H_8ON_4Cl_4$ | 1.84<br>1.73 | 12.79<br>12.61 |
| 33 | (45) | 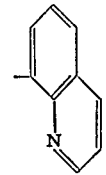 | —O— | 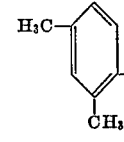 | 137–138 | 66.21<br>66.01<br>$C_{20}H_{15}ON_4Cl$ | 4.17<br>4.14 | 15.44<br>15.59 |
| 34 | (46) | 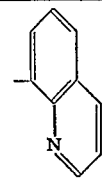 | —O— | 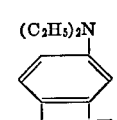 | 153–154 | 65.79<br>65.61<br>$C_{23}H_{22}ON_5Cl$ | 5.28<br>5.37 | 16.68<br>16.48 |

TABLE II—Continued

| Ex. No. | Formula No. | A= | X= | W= | M.P., °C. | C, calc.; C, found | H, calc.; H, found | N, calc.; N, found |
|---|---|---|---|---|---|---|---|---|
| 35 | (47) | 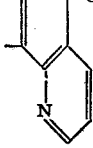 | —O— | 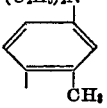 | 172–173 | 60.80 / 60.58 | 4.66 / 4.61 | 15.41 / 15.39 |
|  |  |  |  |  |  | $C_{21}H_{21}ON_5Cl_2$ |  |  |
| 36 | (48) | 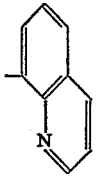 | —O— | 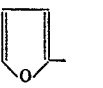 | 200–201 | 59.18 / 58.95 | 2.79 / 2.93 | 17.25 / 17.15 |
|  |  |  |  |  |  | $C_{15}H_9O_2N_4Cl$ |  |  |
| 37 | (49) | 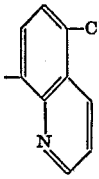 | —O— | 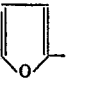 | 211–212 | 53.51 / 53.36 | 2.25 / 2.15 | 15.60 / 15.39 |
|  |  |  |  |  |  | $C_{15}H_8O_2N_4Cl_2$ |  |  |
| 38 | (50) | 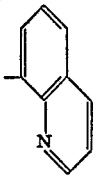 | —O— | 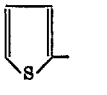 | 204–205 | 56.39 / 56.23 | 2.66 / 2.67 | 16.44 / 16.25 |
|  |  |  |  |  |  | $C_{15}H_9ON_4SCl$ |  |  |
| 39 | (51) | 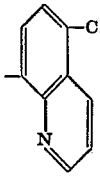 | —O— | 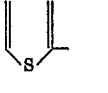 | 241–215 | 51.21 / 51.42 | 2.15 / 2.02 | 14.93 / 14.71 |
|  |  |  |  |  |  | $C_{15}H_8ON_4SCl_2$ |  |  |
| 40 | (52) | 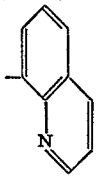 | —O— | 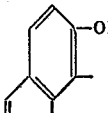 —OH | 170–172 | 65.92 / 65.86 | 3.27 / 3.25 | 13.98 / 13.80 |
|  |  |  |  |  |  | $C_{21}H_{13}O_2N_4Cl$ |  |  |

Examples 41 to 48.—Antibacterial action in the dilution test

In each test 20 mg. of the active substances described in the foregoing examples were dissolved in 10 ml. of propyleneglycol or dimethylsulphoxide (=0.2% of active substance). Of these soltuions 0.25 ml. each was added to 4.75 ml. of sterile glucose broth (=100 parts per million) and the content of each test tube was immediately diluted in the tube at the ratio of 1:10. After inoculation with *Staphylococcus aureus* and, respectively, *Escherichia coli*, the cultures were incubated for 48 hours at 37° C. (test for bacteriostatic effect). After allowing the cultures to grow for 24 hours, the amount retained by a loop of platinum wire from each tube was smeared over a glucose agar plate and likewise incubated for 24 hours at 37° C. (test for bactericidal effect).

After the times mentioned the minimum inhibitory concentration values (parts per million) shown in the following Table III were recorded.

Fungicidal effect in the dilution test.—Solutions of the active substances described in the foregoing examples in propyleneglycol or dimethylsulphoxide in concentrations descending from 500 to 1 part per million were introduced in tubes containing sterile beer wort solution of 10% strength. After inoculation with *Aspergillus niger*, and, respectively, *Rhizopus nigricans*, the cultures were incubated for 72 hours at 25° C. (test for fungistatic effect). The minimum inhibitory concentration values (parts per million) are listed in Table III.

TABLE III

| Example Number | Formula | Minimum inhibitory concentration (p.p.m.) | | | |
| --- | --- | --- | --- | --- | --- |
| | | Bacteriostatic effect on *Staphylococcus aureus* | Bactericidal effect on *Escherichia coli* | Fungistatic effect on— | |
| | | | | *Aspergill. niger* | *Rhizopus nigric.* |
| 41 | [Cl-phenyl-triazine(Cl)-O-quinolinyl] | 10/10 | >100/>100 | <100 | <100 |
| 42 | [H₃C-phenyl-triazine(Cl)-O-quinolinyl] | 100/100 | >100/>100 | <100 | <100 |
| 43 | [Cl-phenyl-triazine(Cl)-O-(Cl,Cl-quinolinyl)] | 10/10 | 10/100 | <100 | <100 |
| 44 | [Cl-phenyl-triazine(Cl)-O-(2-CH₃-quinolinyl)] | 100/100 | 100/>100 | <100 | <100 |
| 45 | [H₃C-phenyl-triazine(Cl)-O-(2-CH₃-quinolinyl)] | 100/100 | 100/>100 | <100 | <100 |
| 46 | [H₃C-phenyl-triazine(Cl)-O-(Cl,Cl-quinolinyl)] | 10/~100 | 100/>100 | <100 | <100 |
| 47 | [Cl-phenyl-triazine(Cl)-O-(Cl,Cl-2-CH₃-quinolinyl)] | 10/~100 | —/>100 | <100 | <100 |
| 48 | [H₃C-phenyl-triazine(Cl)-O-(Cl,Cl-2-CH₃-quinolinyl)] | 10/~10 | —/>100 | <100 | <100 |

Examples 49 to 65.—Effect against bacteria and fungi, measured as the minimal inhibitory concentration in the dilution test The test for the minimal inhibitory concentration was carried out similar to a test carried out under standardized conditions that allows an approximation to absolute minimal inhibitory values of an active substance.

By means of a solution of 1% and one of 0.3% strength of the active substances in dimethylsulphoxide, dilution series, in which each member was a tenth of the preceding member were prepared. By combining the two series the following continuous dilution series was obtained. 1000, 300, 100, 30, 10, 3 p.p.m. and so forth. After inoculation and incubation as described in columns 17, 18 the minimal inhibitory concentrations for the bacteriostatic and the fungistatic effort each were determined.

TABLE IV

| Example Number | Formula | Minimum inhibitory concentration (p.p.m.) | | | |
|---|---|---|---|---|---|
| | | Bacteriostatic effect | | Fungistatic effect | |
| | | Staph. aureus | Escherichia coli | Aspergill. niger | Rhizopus nigricans |
| 49 | [structure] | 10 | 30 | 10 | 10 |
| 50 | [structure] | 100 | 100 | <3 | 30 |
| 51 | [structure] | -- | -- | 30 | 30 |
| 52 | [structure] | -- | -- | 30 | 30 |
| 53 | [structure] | 100 | -- | 100 | 30 |
| 54 | [structure] | -- | -- | 10 | 10 |
| 55 | [structure] | -- | -- | 10 | 10 |

TABLE IV—Continued

| Example Number | Formula | Bacteriostatic effect | | Fungistatic effect | |
|---|---|---|---|---|---|
| | | Staph. aureus | Escherichia coli | Aspergill. niger | Rhizopus nigricans |
| 56 | (CH₃)₃C-C₆H₄-triazine(Cl)-O-dichloroquinoline | 100 | -------- | <3 | 10 |
| 57 | chlorophenyl-triazine(Cl)-O-quinoline | -------- | -------- | 30 | 30 |
| 58 | chlorophenyl-triazine(Cl)-O-quinoline | 100 | -------- | <3 | 30 |
| 59 | chlorophenyl-triazine(Cl)-O-(I,Cl-quinoline) | 30 | 100 | <3 | 30 |
| 60 | dichlorophenyl-triazine(Cl)-O-quinoline | 100 | -------- | 30 | 30 |
| 61 | dichlorophenyl-triazine(Cl)-O-chloroquinoline | 100 | -------- | 30 | 30 |
| 62 | furyl-triazine(Cl)-O-quinoline | -------- | -------- | 100 | 30 |
| 63 | furyl-triazine(Cl)-O-chloroquinoline | -------- | -------- | 10 | 30 |

TABLE IV—Continued

| Example Number | Formula | Minimum inhibitory concentration (p.p.m.) | | | |
|---|---|---|---|---|---|
| | | Bacteriostatic effect | | Fungistatic effect | |
| | | Staph. aureus | Escherichia coli | Aspergill. niger | Rhizopus nigricans |
| 64 | 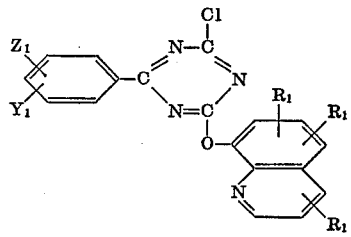 | | | 30 | 10 |
| 65 | 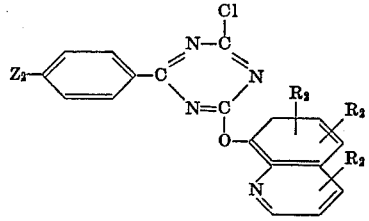 | 100 | | 10 | 10 |

What is claimed is:

1. The triazine compound of the formula

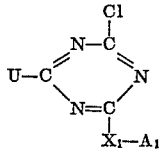

where $X_1$ represents a divalent hetero-atom bridge member selected from the group consisting of —O—, —S—, and —NH—, $A_1$ contains 1 to 2 cyclic nitrogen atoms and represents an aromatic ring system which consists of one to two six-membered rings and is bound through a ring carbon atom with $X_1$, and U represents a member selected from the group consisting of phenyl, phenyl substituted by a member selected from the group consisting of alkyl containing 1 to 6 carbon atoms, alkoxy containing 1 to 6 carbon atoms, halogen, lower alkylated amino and phenyl, naphthyl, furyl and thienyl.

2. The triazine compound of the formula

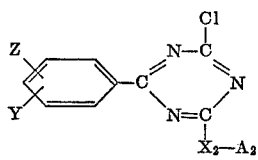

where $A_2$ contains 1 to 2 ring nitrogen atoms and represents an aromatic ring system consisting of one to two fused 6-membered rings bound through a ring carbon atom with $X_2$, $X_2$ represents a divalent hetero-atom bridge member selected from the group consisting of —O— and —S—, and Y is a phenyl group, Z and Y each represent a member selected from the group consisting of hydrogen, an alkyl group, an alkoxy group each containing 1 to 6 carbon atoms, a halogen atom, a lower alkylated amino group, and Y together with Z forming together with the phenyl group, a naphthyl ring.

3. The triazine compound of the formula

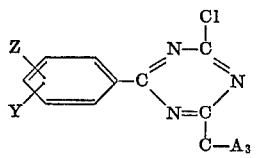

where $A_3$ contains 1 to 2 ring nitrogen atoms and represents an aromatic ring system which consists of two fused 6-membered rings and is bound through a ring carbon atom with the bridge member —O—, Y represents a phenyl group, Z and Y each represent a member selected from the group consisting of hydrogen, an alkyl group, an alkoxy group each containing 1 to 6 carbon atoms, halogen, a lower alkylated amino group, and Y together with Z forming together with the phenyl group, a naphthyl ring.

4. The triazine compound of the formula

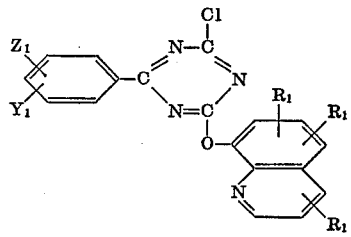

where $Z_1$ and $Y_1$ each represent a member selected from the group consisting of a hydrogen atom, an alkyl group and an alkoxy group each containing 1 to 6 carbon atoms, a halogen atom, an alkylated amino group containing up to 6 carbon atoms and $Z_1$ alone represents a phenyl group, and the radicals $R_1$ each represent a member selected from the group consisting of a hydrogen atom and a halogen atom, each $R_1$ alone represents an alkyl group containing 1 to 4 carbon atoms.

5. The triazine compound according to claim 3, where Y represents hydrogen and Z, as $Z_2$ in para-position to the bond of the phenyl radical with the triazine ring, represents a member selected from the group consisting of a hydrogen atom, an alkyl group and an alkoxy group each containing 1 to 4 carbon atoms, a phenyl group, a dialkylamino group whose alkyl groups contain 1 to 4 carbon atoms, a chlorine and a bromine atom.

6. The triazine compound of the formula

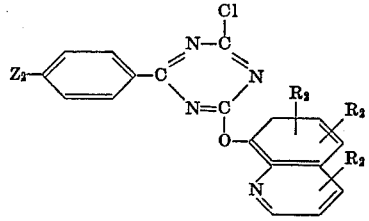

where $Z_2$ represents a member selected from the group consisting of a hydrogen, an alkyl group and an alkoxy group each containing 1 to 4 carbon atoms, a phenyl group, a dialkylamino group whose alkyl radicals contain 1 to 4 carbon atoms, a chlorine and a bromine atom, and the radicals $R_2$ each represent a member selected from the group consisting of hydrogen and halogen each $R_2$ alone representing a member selected from the group consisting of an alkyl group containing 1 to 4 carbon atoms, a nitro, a nitroso and a sulpho group.

7. The compound of the formula
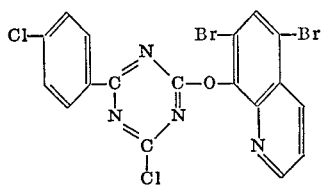
8. The compound of the formula
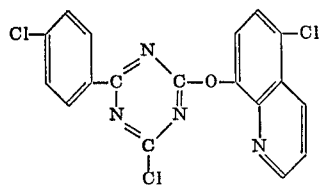
9. The compound of the formula
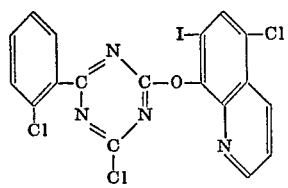
10. The compound of the formula
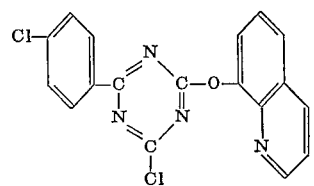
11. The compound of the formula
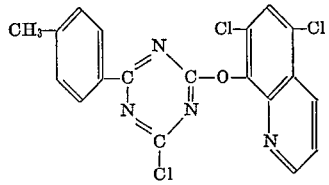
12. The compound of the formula
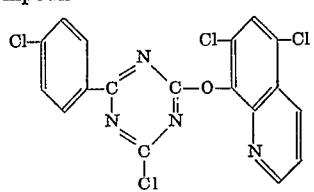
References Cited
UNITED STATES PATENTS
3,293,249   12/1966   Biland et al. _____ 260—248
HENRY R. JILES, *Primary Examiner.*
J. M. FORD, *Assistant Examiner.*

UNITED STATES PATENT OFFICE
CERTIFICATE OF CORRECTION

Patent No. 3,407,201                              October 22, 1968

Christian Luethi et al.

It is certified that error appears in the above identified patent and that said Letters Patent are hereby corrected as shown below:

Column 25, lines 63 to 69, the right-hand portion of the formula should appear as shown below:

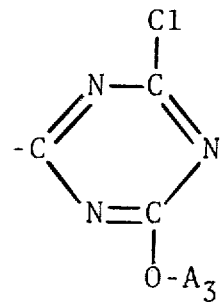

Column 26, lines 57 to 65, the lower right-hand portion of the formula should appear as shown below:

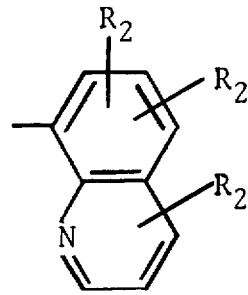

Signed and sealed this 17th day of March 1970.

(SEAL)
Attest:

EDWARD M. FLETCHER, JR.                        WILLIAM E. SCHUYLER, JR.
Attesting Officer                                    Commissioner of Patents